(12) United States Patent
Edward

(10) Patent No.: US 10,806,102 B2
(45) Date of Patent: Oct. 20, 2020

(54) HYDRAULIC DRIVE FOR THE FEED ROLLERS OF A HEAD OF A COMPLETE TIMBER HARVESTER

(71) Applicant: Robert Bosch GmbH, Stuttgart (DE)

(72) Inventor: Iain Edward, Fife (GB)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 15/946,571

(22) Filed: Apr. 5, 2018

(65) Prior Publication Data
US 2018/0288953 A1 Oct. 11, 2018

(30) Foreign Application Priority Data

Apr. 6, 2017 (DE) .......................... 10 2017 205 846

(51) Int. Cl.
| | | |
|---|---|---|
| *F16H 61/444* | (2010.01) | |
| *F16H 61/448* | (2010.01) | |
| *A01G 23/083* | (2006.01) | |
| *F16H 61/4043* | (2010.01) | |
| *F16H 61/452* | (2010.01) | |
| *A01G 23/08* | (2006.01) | |

(52) U.S. Cl.
CPC ....... *A01G 23/083* (2013.01); *F16H 61/4043* (2013.01); *F16H 61/444* (2013.01); *F16H 61/448* (2013.01); *F16H 61/452* (2013.01); *A01G 23/08* (2013.01)

(58) Field of Classification Search
CPC .... A01G 23/08; A01G 23/083; F16H 61/444; F16H 61/448; F16H 61/452; F16H 61/4043; F03C 1/045; F03C 1/0457; F03C 1/0463; F03C 1/0466

See application file for complete search history.

(56) References Cited

U.S. PATENT DOCUMENTS

| | | | | |
|---|---|---|---|---|
| 3,806,281 A | * | 4/1974 | Skinner .................. | F01B 13/06 417/225 |
| 4,244,184 A | * | 1/1981 | Baldauf ................. | B60K 17/10 180/242 |
| 5,001,964 A | * | 3/1991 | Allart ...................... | F03C 1/045 60/420 |
| 5,224,411 A | * | 7/1993 | Fillion .................. | F03C 1/0535 60/484 |
| 5,558,003 A | * | 9/1996 | Bauzou ................. | F03C 1/0447 417/273 |

(Continued)

FOREIGN PATENT DOCUMENTS

| | | |
|---|---|---|
| DE | 102 48 028 B3 | 8/2004 |
| DE | 10 2006 052 050 A1 | 6/2007 |
| DE | 10 2008 000 093 A1 | 8/2008 |

*Primary Examiner* — Dustin T Nguyen
(74) *Attorney, Agent, or Firm* — Maginot, Moore & Beck LLP

(57) ABSTRACT

A hydraulic drive for feed rollers of a head of a complete timber harvester includes two radial piston motors coupled for conjoint rotation to the feed rollers. One radial piston motor has only one displacement volume and the other radial piston motor has two displacement volumes, between which it is possible to switch. A tree trunk clamped between the feed rollers can thus be moved at two speeds. At the higher speed, pressure medium circulates under a control pressure in the second displacement volume of the switchable radial piston motor.

11 Claims, 1 Drawing Sheet

(56) References Cited

U.S. PATENT DOCUMENTS

| | | | | | |
|---|---|---|---|---|---|
| 5,836,231 | A | * | 11/1998 | Leinonen | F01B 1/0603 91/491 |
| 5,996,324 | A | * | 12/1999 | Oligmueller | A01D 69/00 56/11.2 |
| 6,099,273 | A | * | 8/2000 | Allart | F03C 1/045 180/308 |
| 6,318,235 | B1 | * | 11/2001 | Allart | F03C 1/045 60/468 |
| 6,675,575 | B1 | * | 1/2004 | Cunningham | F16H 61/444 180/242 |
| 6,926,372 | B2 | * | 8/2005 | Bigo | F03C 1/045 303/15 |
| 7,090,475 | B2 | * | 8/2006 | Shrive | F03C 1/045 417/286 |
| 7,201,245 | B2 | * | 4/2007 | Shrive | B60K 17/356 180/197 |
| 7,644,580 | B2 | * | 1/2010 | Alfthan | A01G 23/095 60/425 |
| 9,556,735 | B2 | * | 1/2017 | Ryyppo | F01B 1/06 |
| 10,350,995 | B2 | * | 7/2019 | Edward | B60K 17/10 |

* cited by examiner

HYDRAULIC DRIVE FOR THE FEED ROLLERS OF A HEAD OF A COMPLETE TIMBER HARVESTER

This application claims priority under 35 U.S.C. § 119 to patent application no. DE 10 2017 205 846.3, filed on Apr. 6, 2017 in Germany, the disclosure of which is incorporated herein by reference in its entirety.

BACKGROUND

The disclosure relates to a drive for the feed rollers of a head of a complete timber harvester, which is also referred to as a harvester head.

A complete timber harvester is a mobile machine which can move independently between trees to be harvested, e.g. in a wood, and, by means of its head, which is capable of multidirectional movement, can grasp a specific tree trunk, saw it off, free it from branches and cut it into pieces. Particularly during the two last work steps, the tree trunk is moved backward and forward relative to the head by means of feed rollers of the head, which are clamped against the tree trunk. The feed rollers are usually driven by hydrostatic motors.

Each of documents U.S. Pat. No. 7,644,580 B2 and DE 10 2006 052 050 A1 discloses a drive for the feed rollers of a head of a complete timber harvester, in which one hydrostatic radial piston motor has a fixed displacement, while another hydrostatic radial piston motor has a displacement that can be switched between two levels and can thus be operated at two speeds. Connecting the two radial piston motors in series has the effect that the radial piston motor with the fixed displacement is also supplied with different volume flows, depending on the switching of the other radial piston motor, thus allowing the two radial piston motors to be operated synchronously at all times and at two feed rates.

To switch over, the further radial piston motor has two half-motors, of which one half-motor can be deactivated by connecting its input to its output. This gives rise to circulation of pressure medium in the second half-motor in a manner which has substantially no effect on the relevant feed roller.

Since the drive can drive the feed rollers bidirectionally to enable the relevant tree trunk to be moved in both directions, the circulation of pressure medium in the relevant half-motor takes place under high pressure in a first direction of rotation and under low pressure in a second direction of rotation. Circulation under high pressure has the disadvantage of unavoidable power loss (friction), and circulation of the pressure medium under low pressure has the disadvantage that the rollers of the relevant pistons can lose contact with the falling flanks of the cams or peaks of the cam ring of the radial piston motor and strike against the rising flank of the next cam.

Given this situation, it is the underlying object of the disclosure to provide a hydraulic drive for the feed rollers of a head of a complete timber harvester in which the stated disadvantages in selecting the quicker feed rate and the circulation of pressure medium which then takes place are avoided.

SUMMARY

This object is achieved by a drive having the features of the claims.

The claimed hydraulic drive is coupled to feed rollers of a head of a complete timber harvester, which can also be referred to as a harvester head. The drive has a first radial piston motor, which is configured as a twin motor. This has two ports, which are in operative connection with a first group of cams, which can also be referred to as peaks, and it has two further ports, which are in operative connection with a second group of cams. Cylinder-piston combinations of the twin motor, which run over the cams of one of the groups, are connected alternately to the two ports of said groups, i.e. to one port of the group, on the one hand, and to the other port of the group, on the other hand, at each cam. The claimed drive furthermore has a second radial piston motor. The second group of cams of the first radial piston motor can be deactivated by connecting the ports of said group to one another and, according to the disclosure, simultaneously connecting said ports to a control pressure line or a control pressure port of the first radial piston motor. In this case, circulation of the pressure medium of the cylinder-piston combinations which are in operative connection with the second group is achieved and, according to the disclosure, this circulation takes place at a control pressure which is higher than a low pressure and lower than a high pressure of the drive. Thus, the pistons are supplied with the control pressure and held against the cams with low losses, and do not lose contact with said cams, even at relatively high speeds of rotation or speeds of revolution. The control pressure can be 20 to 30 bar, for example.

The drive is preferably bidirectional to enable the relevant tree trunk to be moved in both directions by the head, wherein, in a first direction of rotation of the feed rollers, the second radial piston motor is arranged downstream of the first group of the first radial piston motor, and wherein, in a second direction of rotation of the feed rollers, the second radial piston motor is arranged upstream of the first group of the first radial piston motor. Thus, at the quicker speed of rotation, the pistons which are in operative connection with the second group are supplied with the control pressure in both directions of rotation of the feed rollers and held against the cams with low losses and do not lose contact with said cams.

When the second group is activated, a first half of the total volume flow of a main port of the drive is directed via the cylinder-piston combinations which are in operative connection with the first group and, depending on the direction of rotation, also via the second radial piston motor after this or before this. In this case, a second half of the total volume flow is directed via the cylinder-piston combinations which are in operative connection with the second group and are directed past the second radial piston motor. This gives the slower speed of rotation of the feed rollers of the drive. When the second group is deactivated, the total volume flow of the main port of the drive is directed exclusively via the cylinder-piston combinations which are in operative connection with the first group and, depending on the direction of rotation, also via the second radial piston motor after this or before this. This gives the quicker speed of rotation.

Further advantageous embodiments of the disclosure are described in the dependent claims. In the case of a first radial piston motor of compact construction, the cams of the two groups are distributed over a common cam ring. As an alternative, the cams of each group can be formed on respective cam rings, said cam rings being axially spaced apart. The cam ring or rings is/are preferably at rest, while a cylinder block with cylinders formed therein and pistons guided therein rotates.

A speed selector valve is particularly preferred, wherein, in a first position of the valve spool of said valve, the second group is activated by connecting each of the ports of said group to respective main ports of the drive. In a second position of the valve spool, the second group is deactivated by connecting the two ports of the second group to one another and to the control pressure line or to the control pressure port of the first radial piston motor.

In a preferred embodiment, the speed selector valve is a 5/2-way valve, the valve spool of which is preloaded into the first position by a spring and which can be moved into the second position by means of a control pressure in the control pressure line or at the control pressure port of the first radial piston motor.

To actuate the speed selector valve by means of control pressure medium and to supply the pressure medium circuit with control pressure medium, it is preferred if the control pressure line or the control pressure port is connected via a control pressure branch line to a control pressure space of the speed selector valve, said control pressure space acting counter to the spring, and if the control pressure line or the control pressure port can be connected via a further control pressure branch line to a control pressure port of the speed selector valve. In the second position of the valve spool, the control pressure port of the speed selector valve is connected to the two ports of the second group.

In order to allow gentle switching between the speeds of rotation of the drive according to the disclosure, an electro-proportional control system or a shutoff valve, which can also be referred to as a control valve, arranged in the second control pressure branch line is suitable.

Preferably in a spring-preloaded position of its valve member, the shutoff valve shuts off the control pressure port of the speed selector valve from the control pressure line or the control pressure port of the first radial piston motor, and, in a position that can be produced by the control pressure, connects the control pressure port of the speed selector valve to the control pressure line or the control pressure port of the first radial piston motor.

To enable a change in the speed of rotation of the drive to take place gently, it is preferred if the valve spool of the speed selector valve is continuously adjustable.

The first radial piston motor preferably has a rotor, on the outer circumference of which a stationary housing is provided. The cylinder block is formed on or coupled for conjoint rotation to the rotor. The first main port of the drive and the two ports of the second group are connected to respective encircling annular pressure spaces formed between the rotor and the housing, and the rotor and the housing form a distributor. It is furthermore possible for a port of the first group, which is connected directly to the second radial piston motor, to be connected to a further encircling annular pressure space formed between the rotor and the housing.

The speed selector valve is preferably integrated in a space-saving manner into the housing of the first radial piston motor. To enable passages to be made as short as possible, the speed selector valve can be arranged on the outer circumference of the encircling pressure spaces.

In the first position of the valve spool of the speed selector valve, the encircling pressure space of the first main port of the drive is connected via an inner radial passage formed in the housing and via a first neck of the valve spool and via a further inner radial passage formed in the housing to the encircling pressure space of the first port of the second group. At the same time, the second main port of the drive is connected to at least one outer radial passage formed in the housing, which, in the first position of the valve spool, is connected via a second neck of the valve spool and via a further inner radial passage formed in the housing to the encircling pressure space of the second port of the second group. The slower speed of rotation of the radial piston motors is thereby selected.

In the second position of the valve spool of the speed selector valve, the encircling pressure spaces of the two ports of the second group are connected to one another via the second neck of said valve spool. The quicker speed of rotation of the radial piston motors is thereby selected.

For the connection according to the disclosure of the pressure medium circuit to the control pressure, at least one radial bore, via which the control pressure space at the end can be connected to the second neck, is provided in the region of the second neck in the above-described embodiment of the speed selector valve.

To allow the circulation of pressure medium under control pressure in accordance with the disclosure when the control pressure has moved the valve spool into the second position, the radial bore is opened by means of a spool accommodated in the interior of the valve spool when the control pressure prevails in the control pressure space. To ensure that the control pressure is not built up via the radial bore by a possible high pressure acting on the second neck, this radial bore is closed by means of the spool when the pressure prevailing in the control pressure space is lower than the control pressure.

BRIEF DESCRIPTION OF THE DRAWINGS

An illustrative embodiment of a drive according to the disclosure for the feed rollers of a head of a complete timber harvester is illustrated in the drawings. The disclosure will now be explained in greater detail with reference to the figures of these drawings.

In the drawings.

DETAILED DESCRIPTION

Figure 1:
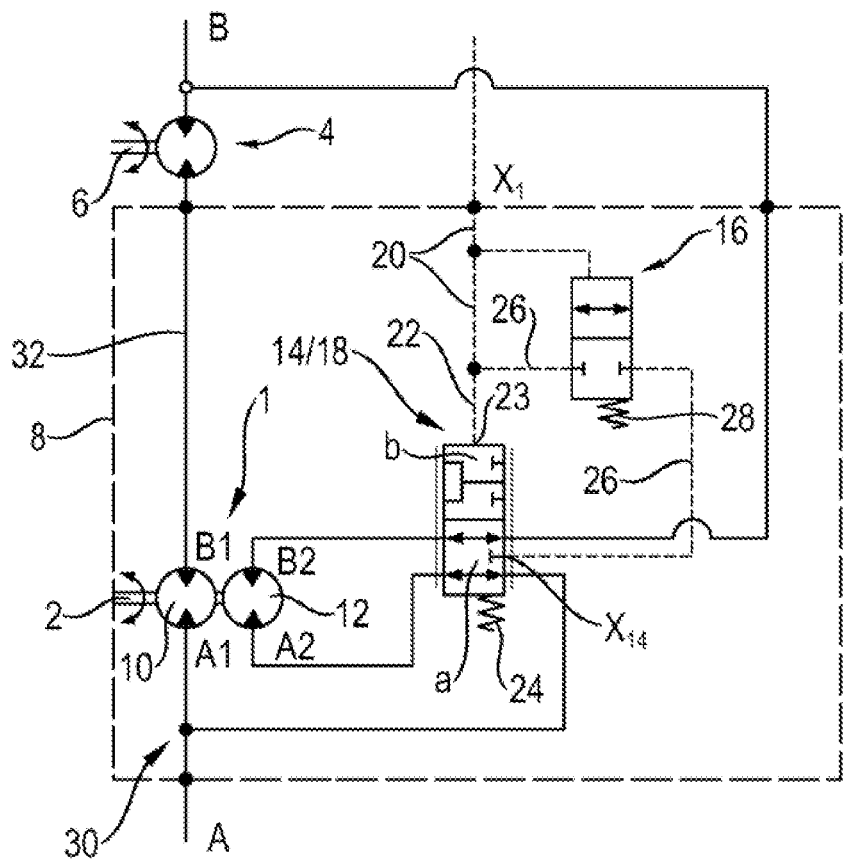
FIG. 1 shows a circuit diagram of a drive according to the disclosure for the feed rollers of a head of a complete timber harvester according to the illustrative embodiment.

FIG. 1 shows a circuit diagram of a drive according to the disclosure for the feed rollers of a head of a complete timber harvester according to the illustrative embodiment. The drive has a first radial piston motor 1, to the output shaft 2 of which at least one feed roller (not shown) of the head is coupled for conjoint rotation. The drive furthermore has a second radial piston motor 4, on the output shaft 6 of which at least one feed roller (not shown) is likewise provided. By means of these feed rollers, a tree trunk is clamped into the head, allowing it to be sawn off, freed from branches and cut into pieces. By means of these feed rollers, the tree trunk is also moved backward and forward by the head during the two last-mentioned functions.

The drive has a first main port A and a second main port B, which—depending on the desired feed direction of the tree trunk—can each be used as a high-pressure and a low-pressure port.

The first radial piston motor 1 has a housing 8, in which one or two stationary cam rings (not shown), on which two groups 10, 12 of cams are distributed, are arranged, wherein the same number of cams is provided in each group 10, 12. These can be distributed alternately on one cam ring, or each of the two cam rings has the cams of one group 10, 12.

The first radial piston motor 1 furthermore has a cylinder block, which is coupled for conjoint rotation to the output shaft 2 and on the circumference of which a plurality of cylinders is distributed, in each of which a piston is guided, which is supported via a respective roller on the cams. Each cam has two oppositely sloping flanks, and therefore each cam forms a peak.

Depending on the desired direction of rotation of the output shaft 2, one of the flanks is a working flank, while the other flank is a return flank. In a first direction of rotation of the first radial piston motor 1, outlet passages, the distribution of which on the circumference of the stationary housing (stator) 8 corresponds to the distribution of the working flanks of the first group 10, are connected to a port A1 of the first group 10, while outlet bores, the distribution of which corresponds to that of the return flanks of the first group 10, are connected to port B1 of the first group 10. In the first direction of rotation of the first radial piston motor 1, outlet passages, the distribution of which corresponds to that of the working flanks of the second group 12, are similarly connected to a port A2 of the second group 12, while outlet bores, the distribution of which corresponds to that of the return flanks of the second group 12, are connected to port B2 of the second group 12.

A speed selector valve 14 and a shutoff valve 16 are furthermore provided in the housing 8 of the first radial piston motor 1. The speed selector valve 14 is designed as a 5/2-way valve. It is connected directly to the two ports A2, B2 of the second group 12 and furthermore to the two main ports A, B of the drive. Finally, the speed selector valve 14 has a control pressure port $X_{14}$. In a first position a of the valve spool 18 of the speed selector valve 14, the first main port A of the drive is connected to the first port A2 of the first group 12, while the second main port B of the drive is connected to the second port B2 of the second group 12. In this case, the control pressure port $X_{14}$ of the speed selector valve 14 is shut off. In a second position b of the valve spool 18, the two ports A2, B2 of the second group 12 are connected to one another and furthermore to the control pressure port $X_{14}$.

A control pressure port $X_1$ is provided on the housing 8 and is connected by a control pressure line 20 and a control pressure branch line 22 to a control pressure space 23, by means of which the valve spool 18 of the speed selector valve 14 can be moved from the first position a to the second position b against the force of a spring 24. The control pressure line 20 furthermore branches into a further control pressure branch line 26, via which the control pressure port $X_1$ of the housing 8 can be connected to the control pressure port $X_{14}$ of the speed selector valve 14.

The shutoff valve 16 is provided in the control pressure branch line 26 and the valve body (collar 51) of said valve shuts off the control pressure port $X_1$ of the housing 8 from the control pressure port $X_{14}$ (radial bores 52) of the speed selector valve 14 in a home position preloaded by a spring 28. The shutoff valve 16 opens when the control pressure exceeds the force of the spring 28.

The main port A of the drive is connected by a branched main line 30 to port A1 of the first group 10, on the one hand, and, in the first position a of the valve spool 18 of the speed selector valve 14, said position being preloaded by the spring 24, to port A2 of the second group 12, on the other hand. The other port B1 of the first group 10 is connected by a connecting line 32 and via the second radial piston motor 4 to the other main port B of the drive. In the position a of the valve spool 18 of the speed selector valve 14, said position being preloaded by the spring 24, the other port B2 of the second group 12 is connected to the other main port B of the drive.

Figure 2:
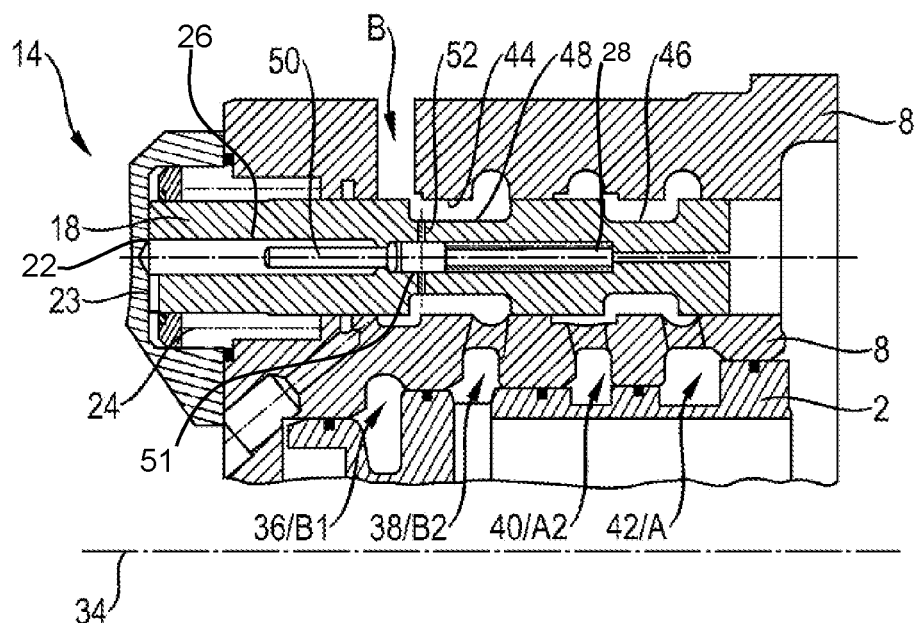
FIG. 2 shows a detail of the first radial piston motor of the drive from FIG. 1 in a longitudinal section.

FIG. 2 shows, in a longitudinal section, part of the housing 8 of the first radial piston motor 1 and a detail of a rotor 2, which is accommodated rotatably therein and is formed integrally with the output shaft 2 (shown in FIG. 1) or coupled for conjoint rotation to said shaft. In this case, the rotor 2 rotates about its longitudinal axis 34.

Arranged on the outer circumference of the rotor 2 are encircling annular pressure spaces 36, 38, 40, 42 running around in a ring shape, which are formed by depressions in the outer circumference of the rotor 2, on the one hand, and by depressions in an inner circumference of the housing 8, on the other hand. A valve bore 44 of the speed selector valve 14 is formed in the housing 8 on the outer circumference of these pressure spaces 36, 38, 40, 42. The pressure space 36 which forms port B1 of the first group 10 has no connection to this valve bore 44. The pressure space 38 arranged adjacent thereto, which forms port B2 of the second group 12, and the pressure space 40 arranged adjacent thereto, which forms port A2 of the second group 12, and the pressure space 42 arranged adjacent thereto, which is connected to the first main port A of the drive, are each connected by a radial passage (not sectioned in the plane of the drawing) to respective encircling pressure spaces of the speed selector valve 14, which are arranged on the inner circumference of the valve bore 44.

In FIG. 2, the valve spool 18 of the speed selector valve 14 is furthermore shown in its first position a and, in this position, the pressure space 40 of port A2 of the second group 12 is connected via a first neck 46 to the pressure space 42 of the first main port A of the drive, while, at the same time, the pressure space 38 of port B2 of the second group 12 is connected via a second neck 48 to the second main port B of the drive. The second main port B is formed by a bore routed radially outward from the valve bore 44.

Arranged at the end of the valve spool 18 is the control pressure space 23, which has a minimum size in the first position a of the valve spool 18, which is shown in FIG. 2. When acted upon by control pressure medium, the valve spool 18 is moved (to the right in FIG. 2), with the result that the two main ports A, B are shut off, while the two inner pressure spaces 38, 40 of the two ports A2, B2 of the second group 12 are connected to one another via the second neck 48.

A spool 50 is guided in a longitudinal bore in the interior of the valve spool 18. This serves to shut off the second neck 48 from the control pressure space 23 in the first position a of the valve spool 18, which is shown in FIG. 2, and, according to the disclosure, serves to connect the second neck 48 and hence the two ports A2, B2 of the second group 12 to the control pressure space 23 in the second position b of the valve spool 18. For this purpose, a plurality of radial bores 52 are provided on the inner circumference of the second neck 48, said bores being closed by a collar on the spool 50 in the position a of the valve spool 18, which is shown in FIG. 2. When the control pressure space 23 is filled with control pressure medium, the valve spool 18 and furthermore also the spool 50 are moved to the right out of their positions shown in FIG. 2, as a result of which the control pressure space 23 is, according to the disclosure, connected via the radial bores 52 and the second neck 48 to the two ports A2, B2 of the second group 12.

A disclosure is made of a hydraulic drive having two radial piston motors, which are coupled for conjoint rotation to feed rollers of a harvester head, wherein one radial piston motor has only one displacement volume and the other radial piston motor has two displacement volumes, between which it is possible to switch. A tree trunk clamped between the feed rollers can thus be moved at two speeds. At the higher speed, pressure medium circulates under a control pressure in the second displacement volume of the switchable radial piston motor.

LIST OF REFERENCE SIGNS 1 first radial piston motor
2 output shaft/rotor
4 second radial piston motor
6 output shaft
8 housing
10 first group of cams
12 second group of cams
14 speed selector valve
16 shutoff valve
18 valve spool
20 control pressure line
22 control pressure branch line
23 control pressure space
24 spring
26 control pressure branch line
28 spring
30 main line
32 connecting line
34 longitudinal axis
36 pressure space
38 pressure space
40 pressure space
42 pressure space
44 valve bore
46 first neck
48 second neck
50 spool
52 radial bore
A first main port
B second main port
a first position
b second position
A1, B1 port of the first group
A2, B2 port of the second group
$X_{14}$ control pressure port of the speed selector valve
$X_1$ control pressure port of the first radial piston motor

What is claimed is:

1. A hydraulic drive for feed rollers of a head of a complete timber harvester, comprising:
    a radial piston motor unit including
        a first radial piston motor having a first and second hydraulic port, and
        a second radial piston motor having a third and fourth hydraulic port;
    a first shaft operably connected to the radial piston motor unit;
    a hydraulic motor unit;
    a second shaft operably connected to the hydraulic motor unit; and
    a speed selector valve configured as a 5/2-way valve with a valve spool preloaded into a first position by a first spring and configured to be moved into a second position by a control pressure of a first control pressure port, wherein:
        in the second position of the valve spool, the speed selector valve places the hydraulic drive in a first operational state by placing the third and fourth hydraulic ports in fluid communication with each other such that hydraulic fluid circulates into the second radial piston motor through the third port and out of the second radial piston motor through the fourth port without the circulating hydraulic fluid causing the first shaft to rotate, and wherein the circulating hydraulic fluid is in fluid communication with a control pressure line or the first control pressure port in the first operational state; in the first position of the valve spool of the speed selector valve places the hydraulic drive in a second operational state by placing the third and fourth hydraulic ports in fluid communication with first and second main ports of the hydraulic drive;
        the control pressure line or the first control pressure port is connected via a control pressure branch line to a control pressure space of the speed selector valve, the control pressure space acting counter to the first spring, and configured to be connected via a further control pressure branch line to a second control pressure port of the speed selector valve; and
        in the second position of the valve spool, the second control pressure port is connected to the third and fourth hydraulic ports.

2. The hydraulic drive according to claim 1, wherein:
    in a first direction of rotation of the radial piston motor unit and the hydraulic motor unit, the hydraulic motor unit is arranged downstream of the radial piston motor unit;
    in a second direction of rotation of the radial piston motor unit and the hydraulic motor unit, the hydraulic motor unit is arranged upstream of the radial piston motor unit; and
    the hydraulic drive is bidirectional.

3. The hydraulic drive according to claim 1, further comprising:
    a shutoff valve arranged in the further control pressure branch line.

4. The hydraulic drive according to claim 3, wherein:
    in a first shutoff valve position preloaded by a second spring, the shutoff valve shuts off the second control pressure port of the speed selector valve from the control pressure line or the first control pressure port; and
    in a second shutoff valve position configured to be produced by the control pressure, the shutoff valve connects the second control pressure port of the speed selector valve to the control pressure line or the first control pressure port.

5. The hydraulic drive according to claim 1, further comprising:
    a stationary housing, wherein:
        the radial piston motor unit further includes a rotor;
        the stationary housing is disposed on an outer circumference of the rotor; and
        the first main port of the hydraulic drive, the third hydraulic port, and the fourth hydraulic port are connected to respective encircling pressure spaces formed between the rotor and the stationary housing.

6. The hydraulic drive according to claim 5, wherein the speed selector valve is arranged in the stationary housing.

7. The hydraulic drive according to claim 6, wherein:
    the valve spool includes a first neck and a second neck; and
    in the first position of the valve spool:
        the encircling pressure space of the first main port of the hydraulic drive is connected via a first passage, the first neck, and a second passage to the encircling pressure space of the third hydraulic port; and
        the second main port of the hydraulic drive is connected to at least one third passage that is connected via the second neck and a fourth passage to the encircling pressure space of the fourth hydraulic port.

8. The hydraulic drive according to claim 7, wherein, in the second position of the valve spool, the encircling pressure spaces of the third and fourth hydraulic ports are connected to one another via the second neck of the valve spool.

9. The hydraulic drive according to claim 7, further comprising:
   at least one radial bore arranged in the valve spool in a region of the second neck and configured to connect a control pressure space to the second neck.

10. The hydraulic drive according to claim 9, further comprising:
    a spool arranged in an interior of the valve spool, wherein:
       the at least one radial bore is configured to be opened by the spool when a control pressure prevails in the control pressure space; and
       the at least one radial bore is configured to be closed by the spool when a pressure prevailing in the control pressure space is lower than the control pressure.

11. The hydraulic drive according to claim 6, wherein the speed selector valve is arranged in the stationary housing on an outer circumference of the encircling pressure spaces.

* * * * *

UNITED STATES PATENT AND TRADEMARK OFFICE
CERTIFICATE OF CORRECTION

PATENT NO.         : 10,806,102 B2
APPLICATION NO.    : 15/946571
DATED              : October 20, 2020
INVENTOR(S)        : Iain Edward Page 1 of 1

It is certified that error appears in the above-identified patent and that said Letters Patent is hereby corrected as shown below:

In the Claims

In Claim 1, at Column 8, Lines 6-7: "in the first position of the valve spool of the speed selector valve places the hydraulic drive" should read --in the first position of the valve spool of the speed selector valve, the speed selector valve places the hydraulic drive--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*